United States Patent
Haussmann

(10) Patent No.: US 9,929,447 B2
(45) Date of Patent: Mar. 27, 2018

(54) COOLING DEVICE AND VEHICLE BATTERY ASSEMBLY

(75) Inventor: Roland Haussmann, Wiesloch (DE)

(73) Assignee: VALEO KLIMASYSTEME GMBH, Bad Rodach (DE)

( * ) Notice: Subject to any disclaimer, the term of this patent is extended or adjusted under 35 U.S.C. 154(b) by 1223 days.

(21) Appl. No.: 13/813,393

(22) PCT Filed: Jul. 21, 2011

(86) PCT No.: PCT/EP2011/062590
§ 371 (c)(1),
(2), (4) Date: Apr. 9, 2013

(87) PCT Pub. No.: WO2012/013583
PCT Pub. Date: Feb. 2, 2012

(65) Prior Publication Data
US 2013/0189558 A1    Jul. 25, 2013

(30) Foreign Application Priority Data
Jul. 30, 2010 (DE) .................. 10 2010 032 898

(51) Int. Cl.
*F25D 23/12* (2006.01)
*H01M 10/625* (2014.01)
(Continued)

(52) U.S. Cl.
CPC ..... *H01M 10/5016* (2013.01); *H01M 2/1083* (2013.01); *H01M 10/613* (2015.04);
(Continued)

(58) Field of Classification Search
CPC ............. H01M 2/1083; H01M 10/625; H01M 10/658; H01M 10/6568; H01M 10/613;
(Continued)

(56) References Cited

U.S. PATENT DOCUMENTS 4,109,707 A * 8/1978 Wilson ...................... F28F 3/12
165/170
5,089,936 A * 2/1992 Kojima ............... H01L 23/4006
257/697
(Continued)

FOREIGN PATENT DOCUMENTS

DE    102008034887 A1    6/2009
DE    102008027293 A1    12/2009
(Continued)

OTHER PUBLICATIONS

Machine Translation of DE 102008034854.*
(Continued)

*Primary Examiner* — Frantz Jules
*Assistant Examiner* — Joseph Trpisovsky
(74) *Attorney, Agent, or Firm* — Howard & Howard Attorneys PLLC

(57) ABSTRACT

The invention refers to a cooling device (10) for a vehicle battery with at least one coolant line (12) and at least one separate clamping element (14), which is made of an elastic material, for pressing the coolant line (12) directly up against a flat surface of the vehicle battery. The coolant line (12) is flat, with an essentially flat upper surface (13) for contact with the flat face of the vehicle battery. The invention also concerns a vehicle battery assembly (100) with a vehicle battery that contains multiple battery elements (102) and a cooling device (10) such as that mentioned above.

20 Claims, 2 Drawing Sheets

Figure 1:
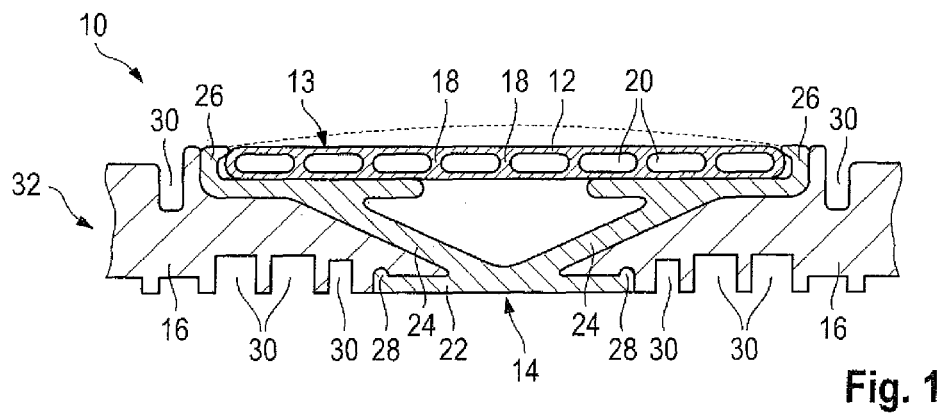

(51) Int. Cl.
*H01M 2/10* (2006.01)
*H01M 10/6556* (2014.01)
*H01M 10/6568* (2014.01)
*H01M 10/613* (2014.01)
*H01M 10/658* (2014.01)

(52) U.S. Cl.
CPC ....... *H01M 10/625* (2015.04); *H01M 10/658* (2015.04); *H01M 10/6556* (2015.04); *H01M 10/6568* (2015.04)

(58) Field of Classification Search
CPC . H01M 10/6556; H01M 10/60; H01M 10/653
USPC ..... 62/259.2; 165/83, 84, DIG. 44, DIG. 47, 165/DIG. 48
See application file for complete search history.

(56) References Cited

U.S. PATENT DOCUMENTS

| | | | | |
|---|---|---|---|---|
| 5,578,393 | A | * | 11/1996 | Haskins .............. H01M 2/1094 429/120 |
| 2004/0142238 | A1 | * | 7/2004 | Asahina ................ B60L 3/0046 429/176 |
| 2010/0062321 | A1 | | 3/2010 | Nakamura |
| 2011/0132580 | A1 | | 6/2011 | Herrmann et al. |

FOREIGN PATENT DOCUMENTS

| DE | 102008034854 A1 | 1/2010 |
|---|---|---|
| DE | 102008059953 A1 | 6/2010 |

OTHER PUBLICATIONS

English language abstract for DE 102008027293 extracted from the espacenet.com database on May 3, 2013, 19 pages.
English language abstract and machine-assisted English translation for DE 102008034854 extracted from the espacenet.com database on May 3, 2013, 29 pages.
English language abstract and machine-assisted English translation for DE 102008034887 extracted from the espacenet.com databases on May 3, 2013, 20 pages.
English language abstract and machine-assisted English translation for DE 102008059953 extracted from the espacenet.com database on May 3, 2013, 21 pages.
International Search Report for Application No. PCT/EP2011/062590 dated Oct. 19, 2011, 4 pages.

\* cited by examiner

COOLING DEVICE AND VEHICLE BATTERY ASSEMBLY

RELATED APPLICATIONS

This application is the National Stage of International Patent Application No. PCT/EP2011/062590, filed on Jul. 21, 2011, which claims priority to and all the advantages of German Patent Application No. DE 102010032898.7, filed on Jul. 30, 2010, the content of which is incorporated herein by reference.

The invention relates to a cooling device for a vehicle battery plus a vehicle battery assembly. The battery is specifically the power source for an electrical or hybrid vehicle.

Prior art discloses cooling devices for vehicle batteries in which a heat transfer plate is provided that is in contact with a surface of the vehicle battery that is to be cooled. In turn, the heat transfer plate is cooled locally by a coolant line. A cooling device such as this is expensive to make and the heat that has to be removed from the vehicle battery has to be transferred from the vehicle battery to the thermal transfer plate and then from the thermal transfer plate to the coolant lines and finally to the coolant itself, whereby there is a heat flow within the heat transfer plate due to the local configuration of the coolant lines.

The aim of the invention is to provide a coolant device for a vehicle battery that is simple to construct and provides good cooling capacity, plus a vehicle battery assembly using such a device.

This problem is solved by a cooling device for a vehicle battery in accordance with the invention, in which the cooling device has at least one coolant line and at least one separate clamping element, made of an elastic material, to press the coolant pipework directly up against a flat side of the vehicle battery. The coolant line is flat, designed with an essentially flat upper surface for contact with the flat side of the vehicle battery. Preferably, the cross-section of the coolant line should have a width that is greater than its height. The construction of the cooling device is straight-forward, because it is designed for a flat side of a vehicle battery and does not need to be adapted for any complex three-dimensional shape the vehicle battery may have. The heat is transferred directly from the flat side of the vehicle battery via the wall of the coolant line and into the coolant. An intermediate thermal transfer element between the coolant line and the surfaces of the vehicle battery that are to be cooled is thus not needed.

The upper side of the coolant line is the side of the coolant line with the broader cross-section.

Making the coolant line in a flat shape means on the one hand that the upper side for contact with the flat side of the vehicle battery becomes larger, and on the other that the height of the space needed to build the cooling device in is reduced.

The upper side of the coolant line and cooling device is defined as that side of the coolant line or cooling device that is in contact with the flat side of the battery. In particular when the coolant device has been built into a vehicle battery assembly, the directions should therefore be seen as being relative to the flat side of the battery.

The flat side of the vehicle battery can refer to the entire vehicle battery or to an individual battery cell group—so-called battery packs—that for example contain battery cells connected together within a casing, or in the case where the vehicle battery has several battery packs.

The coolant line may have a cross-section that is slightly convex towards the top when not pressed in place. The compressive force applied by the clamping element presses the upper side of the flat coolant line fully flat against the flat side of the vehicle battery, thereby evening out the manufacturing tolerances between the flat side of the vehicle battery and the coolant line.

According to a preferred embodiment, the clamping element is placed against the underside of the flat coolant line, preferably at opposite side edges of the coolant line.

It is possible for the clamping element to consist of two independently deformable arms, preferably angled obliquely upwards to the coolant line, each placed at opposite side edges at the underside of the flat coolant line, with the coolant line preferably bridging the arms. In particular, the clamping element is made as a single piece.

The clamping element can be made in such a way that pressing the clamping element against the coolant line against the flat side of the vehicle battery with a predefined compressive force deforms the clamping element elastically into a compressed configuration, instead of the basic configuration in which the clamping element is not pressed up against the flat side of the battery.

To create the cooling device as a structural unit, for example for ease of transport, the clamping element can be created in a shape that interlocks with the coolant line.

For good thermal insulation of the coolant line and the vehicle battery, at least one thermal insulation component can be included that is bound to the clamping element and provides insulation for the flat side of the battery.

Preferably, the clamping element is at least partially embedded in the thermal insulation component. This makes it easy for the clamping element and the thermal insulation component to interlock with one another.

It is possible for the underside of the clamping element to be extensively (and more specifically completely) in contact with the thermal insulation component. To compensate for bending of the clamping element or manufacturing tolerances, the thermal insulation component can be deformable and/or compressible. For example, the thermal insulation component is at least partially deformed and/or compressed when the clamping element deforms.

The said one or more clamping elements and/or one or more thermal insulation components can be made of plastic and a thermoplastic elastomer (TPE), in particular by two-component injection molding.

Multiple clamping elements can be used, mechanically connected via at least one thermal insulation component. This makes is possible to position the various clamping elements with respect to each other using the thermal insulation components to which the clamping elements are bound.

The one or more coolant lines, one or more clamping elements and one or more thermal insulation components preferably define a cooling floor, of which the total surface matches the flat side of the vehicle battery. The surface of the cooling floor thereby matches the area of the flat side of the vehicle battery pack that is to be cooled, or the entire battery. In this way, the total surface area of the cooling floor is aligned to the surface of the vehicle battery pack that is to be cooled, or of the entire battery pack.

The upper surface of the upper sides of the coolant lines can advantageously cover between 35% and 70% of the total surface of the flat side of the vehicle battery. This means that the upper surface of the upper sides of the coolant lines are aligned with between 35% and 70% of the total surface area of the base of the battery that is to be cooled. The improved heat transfer means that it is not necessary to design the entire upper side of the cooling floor or the entire base surface of the battery module as flat coolant lines.

The cross-section of the coolant line is for example twice as wide as its height, or preferably five times or even more preferably ten times greater. The flatter the design of the coolant line, the larger the upper side becomes and the lower the built-in height of the cooling device can therefore be.

The coolant line is for example a flat two-dimensional component, preferably with multiple parallel coolant channels.

The coolant used in the cooling device can be either a phase-changing refrigerant fluid or a coolant liquid.

According to one preferred variant, multiple coolant lines are provided next to one another, wherein the coolant lines preferably have a common thermal insulation component and the clamping elements are held in the thermal insulation component. If multiple coolant lines are used, larger surfaces are cooled and/or multiple coolant lines of lesser width can be used.

The aim of the invention is further achieved by using a vehicle battery assembly with a vehicle battery that contains multiple battery elements, plus one of the above-mentioned cooling devices, wherein the cooling device is positioned between one of the flat sides of the battery elements that are to be cooled and a casing of the vehicle battery, and at least one coolant line that is placed directly up against the flat surface of the battery elements that are to be cooled.

Figure 2:
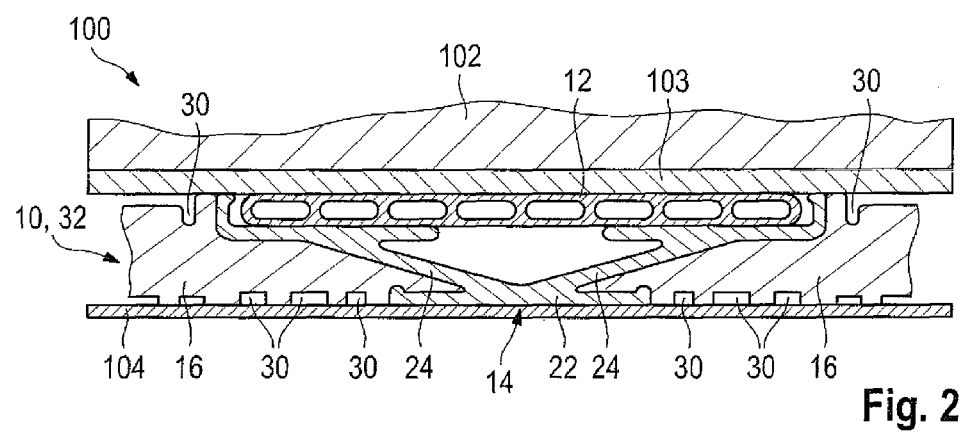
Figure 3:
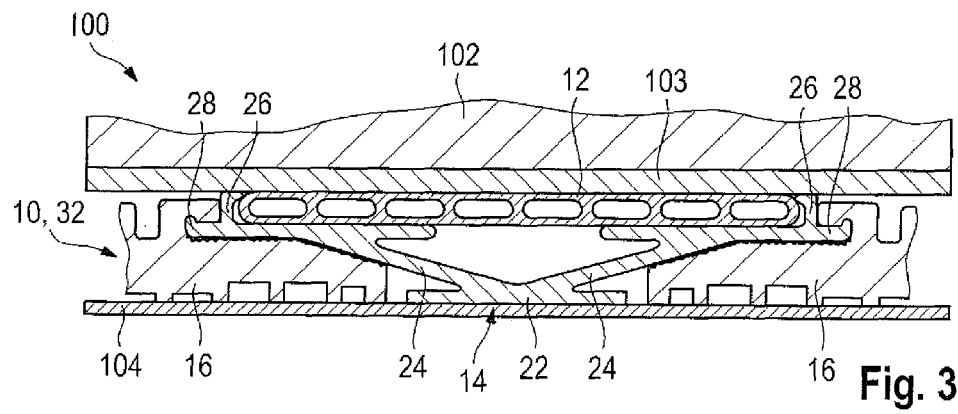
Figure 4:
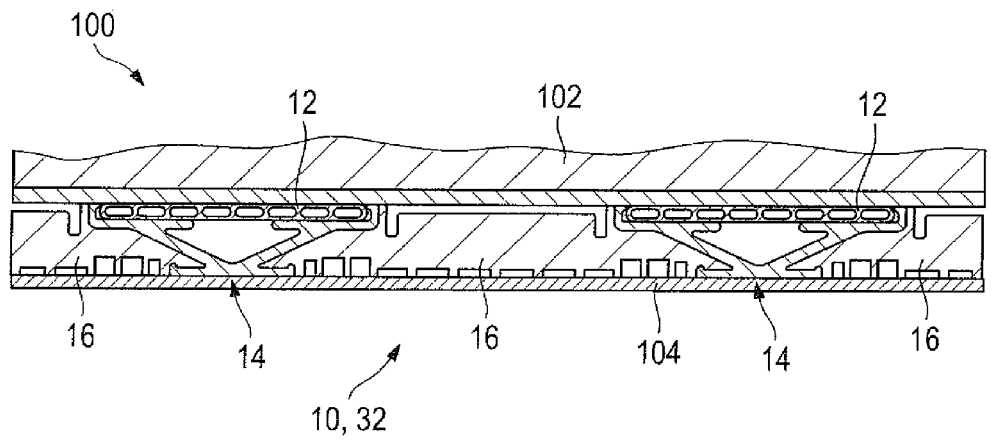
Figure 5:
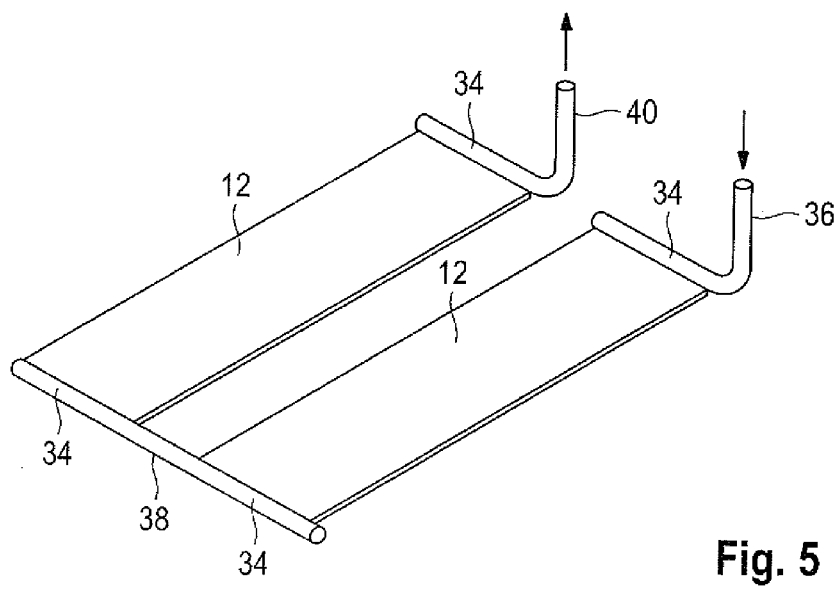

Further characteristics and benefits of the invention derive from the description below and from the following drawings, to which reference is made. The drawings show:

In FIG. 1, a cooling device according to the invention, in its basic configuration;

In FIG. 2, a cooling device according to FIG. 1, in the compressed configuration;

In FIG. 3, a cooling device according to a second variant of the invention;

In FIG. 4, a vehicle battery assembly with a cooling device in accordance with a third embodiment of the invention, and In FIG. 5, a detailed view of the flat coolant lines of a cooling device in accordance with FIG. 4.

FIG. 1 shows a cooling device 10 with a coolant line 12, a clamping element 14 and two thermal insulation elements 16. The coolant line 12 is flat, with the cross-section of the coolant line 12 being broader than it is high. In the variant shown, the breadth of the coolant line 12 is more than ten times as great as its height.

The coolant line 12 is divided by several supporting walls 18 into numerous coolant channels 20. These supporting walls 18 increase the mechanical stability of the flat coolant line 12.

To reduce the weight of the cooling device 10, it is advantageous for the strength of the wall of the coolant line 12 to be kept to a minimum and for the coolant line 12 to be made of a lightweight material such as aluminum, for example by extrusion.

The clamping element 14 has a flat bottom section 22, from which two arms 24 extend diagonally upwards to the coolant line 12. At the ends of the arms 24, the clamping element 14 is located at opposite side edges on the underside of the flat coolant line 12, with the coolant line 12 bridging the two arms 24.

Furthermore, the arms 24 each have an extension 26 at their ends, enclosing the coolant line 12 at the side edge and thereby creating an interlocking connection between the clamping element 14 and the coolant line 12.

The clamping element 14 is made of elastic material, so that it can press the coolant line 12 directly up against a flat side of the vehicle battery. FIG. 1 shows a basic configuration of the clamping element 14, in which the clamping element 14 is not pressing the coolant line 12 up against the flat side of the battery. In this basic configuration, the clamping element 14 can be elastically relaxed or can provide pre-tensioning that acts on the extensions 26 of the clamping element 14 against the side edges of the coolant line 12.

The thermal insulation components 16 are manufactured from a deformable and/or compressible foam material. The two thermal insulation components 16 are each interlocked with and bound to the clamping element 14. A projection 28 of the clamping element 14 at the bottom section 22 engages in the thermal insulation component 16. In the embodiment illustrated, parts of the clamping element 14 are embedded in the thermal insulation component 16.

In order to make it easier to deform the thermal insulation component 16, deformation cut-aways 30 are made on the upper and lower sides of the thermal insulation component 16. These deformation recesses 30 can also be used to achieve intended changes in local deformation behavior of the thermal insulation component 16.

Coolant line 12, clamping element 14 and the thermal insulation component 16 form an interconnected assembly, which is a cooling floor 32.

FIG. 2 shows the cooling device from FIG. 1, wherein the cooling device 10 has been built into a vehicle battery assembly 100 and positioned between a battery element 102 and the casing 104 of a vehicle battery. The height of the cooling device 10 has been compressed, in which the arms 24 of the clamping element 14 are elastically sprung in a compressing configuration and the upper side 13 of the coolant line 12 is pressing against a flat side 103 of the battery element 102 with a specific contact pressure.

Similarly, the thermal insulation components 16 are deformed, particularly in the area around the deformation cut-aways 30.

The contact force exerted on the coolant line 12 is determined on the one hand by the spring constants of the deformable arms 24 of the clamping element 14 and on the other by the compressibility of the material of the thermal insulation component 16, particularly in the area around the clamping element 14.

As can be seen in FIG. 2, the extensions 26 of the arms 24 are no longer engaged with the side edges of the coolant line 12 when in the clamping configuration. When the clamping element 14 is relaxed, the arms 24 will however spring back and the extensions 26 will once again engage with the side edges of the coolant line 12. This ensures that the coolant line 12 is permanently attached to the clamping element 14 when the unit has not been built in.

FIG. 3 shows a second embodiment of a cooling device 10, in which the thermal insulation component 16 is designed in such a way that there is no material of the thermal insulation component 16 at the bottom section 22 of the clamping element 14. This makes it easier to deform the clamping element 14. The thermal insulation component 16 is interlocked with a protrusion 28 of the clamping element 14 at the arms 24. Moreover, the clamping element 14 has a rough surface in the contact area of the thermal insulation component 16, to achieve better adhesion between the thermal insulation component 16 and the clamping element 14.

FIG. 4 illustrates a third variant of the cooling device 10, which comprises a cooling floor 32 with two coolant lines 12, two clamping elements 14 and three thermal insulation components 16.

The coolant lines 12 and the clamping element 14 are all identical to those in the cooling device 10 shown in FIGS. 1 and 2. The two clamping elements 14 are each interlocked with and bound to the central thermal insulation component 16. The central thermal insulation component 16 is a common thermal insulation component 16 in which the clamping elements 14 are lodged and which thereby defines the relative positioning of the clamping elements.

It is also possible for the three thermal insulation components 16 shown in FIG. 4 to be connected directly to each other.

The cooling floor 32 has a total area on the upper side that matches the flat side surfaces of the battery elements 102 that are to be cooled. The surface area of the upper side 13 of the coolant lines 12 comprises between 35% and 70% of the total area of the top surface of the cooling floor 32.

FIG. 5 shows a perspective view of the two coolant lines 12 of the cooling device from FIG. 4. The two flat coolant lines 12 each have a coolant connector 34 on their front faces. The first coolant line 12, which is shown at the bottom right of FIG. 5, has a first coolant connector 34 that is connected to a coolant inflow 36, and an opposing second coolant connector 34 that is connected via a coolant loop 38 to a coolant connector 34 on the second coolant line 12. The second coolant connector 34 of the second coolant line 12 is connected to a coolant outflow 40.

The two coolant lines 12 are integrated into a common coolant circuit, in which the coolant lines 12 flow in opposite directions. It is of course also possible for a coolant device 10 to have multiple coolant lines 12 that are integrated parallel to one another in a coolant circuit.

A phase-changing coolant fluid or a coolant liquid can be used as the refrigerant. The coolant connections 34 permit a distribution of the coolant over multiple coolant channels 20 in particular.

In the embodiments shown, the clamping element 14 is always made as a single piece. It would however also be possible to make the clamping element in several pieces, for instance using elastic and inelastic components. It is also possible for the clamping element 14 to extend over the entire length of the coolant line or for several clamping elements 14 to be provided along the axial direction of the coolant line 12.

The clamping element 14 and the thermal insulation element 16 are made of a material with low thermal conductivity, to reduce heat conduction between the casing 104 and the flat side 103 of the battery element 102 or the coolant line 12. The clamping element 14 and the thermal insulation element 16 can be made together, for instance by casting or two-component injection molding.

In the variant shown, the two arms 24 of the clamping element 14 are each up against opposite side edges of the coolant line 12. Alternatively, it is possible for the clamping element to be up against the entirety of the coolant line 12 and supported against the casing of the vehicle battery with two arms that extend diagonally downwards.

The battery elements 102 can be individual battery cells or battery cell assemblies, which for example are designed in a common housing with a common electrical connection and common surfaces to be cooled.

The coolant line 12 is preferably made of a lightweight material with high thermal conductivity, especially aluminum, which in the illustrated embodiment is an extrusion profile.

The coolant lines 12 can have a slight convex bulge upwards when they are not pressed against the bottom of the battery (see the dashed lines in FIG. 1). This means that a tensioning force will be exerted upwards when a force is applied to the side edges, in order to even out tolerances and unevenness of the battery bottom and the upper side of the lines 12.

The coolant used can be either a single-phase coolant, for instance water, glycol or a water/glycol mixture, or a phase-changing refrigerant, particularly based on carbon dioxide.

What is claimed is:

1. A cooling device for a vehicle battery with at least one coolant line and a clamping element, which is made of an elastic material, for pressing the at least one coolant line directly up against a flat surface of the vehicle battery, wherein the at least one coolant line has an essentially flat upper surface for contact with the flat surface of the vehicle battery, and at least one thermal insulation component is included that is bound to the clamping element and also provides insulation for the flat surface of the vehicle battery; and
   wherein an entirety of the clamping element is disposed for contact between a casing of the vehicle battery and the vehicle battery.

2. A cooling device according to claim 1, wherein the at least one coolant line has a cross-section that is convex in shape towards an upper side when not pressed in place.

3. A cooling device according to claim 1, the clamping element is up against an underside of the at least one coolant line.

4. A cooling device according to claim 1, wherein the clamping element comprises two independently deformable arms, each placed at opposite side edges at an underside of the at least one coolant line.

5. A cooling device according to claim 1, wherein the clamping element is shaped to interlock with the at least one coolant line.

6. A cooling device according to claim 1, wherein the clamping element is at least partially embedded in the at least one thermal insulation component.

7. A cooling device according to claim 1, wherein the clamping element is in contact with the at least one thermal insulation component.

8. A cooling device according to claim 1, wherein the clamping element comprises multiple separate clamping elements mechanically connected via the at least one thermal insulation component.

9. A cooling device according to claim 1, wherein the at least one coolant line, the clamping element, and the at least one thermal insulation component define a cooling floor, of which the total surface corresponds to the flat surface of the vehicle battery.

10. A cooling device according to claim 1, wherein upper surfaces of upper sides of the at least one coolant line are aligned with between 35% and 70% of the total surface area of the base of the battery that is to be cooled.

11. A cooling device according to claim 1, wherein a cross-section of the at least one coolant line is twice as wide as it is high.

12. A cooling device according to claim 1, wherein the at least one coolant line is a flat, two-dimensional component having multiple coolant channels.

13. A cooling device according to claim 1, wherein the at least one coolant line comprises multiple coolant lines provided next to one another, and wherein the multiple coolant lines have a common thermal insulation component and the clamping element is held in the thermal insulation component.

14. A vehicle battery assembly with a vehicle battery containing multiple battery elements having flat sides and the cooling device according to claim 1, wherein the cooling device is positioned between one of the flat sides of the battery elements that are to be cooled and the casing of the vehicle battery and the at least one coolant line that is placed directly up against the flat side of the battery elements that are to be cooled.

15. A cooling device according to claim 1, wherein a cross-section of the at least one coolant line has a width greater than its height.

16. A cooling device according to claim 3, wherein the clamping element is up against the underside of the at least one coolant line at opposite side edges of the coolant line.

17. A cooling device according to claim 4, wherein the two independently deformable arms of the clamping element are angled obliquely upwards to the at least one coolant line.

18. A cooling device according to claim 1, wherein a cross-section of the at least one coolant line is five times as wide as it is high.

19. A cooling device for a vehicle battery with at least one coolant line and a clamping element, which is made of an elastic material, for pressing the at least one coolant line directly up against a flat surface of the vehicle battery, wherein the at least one coolant line has an essentially flat upper surface for contact with the flat surface of the vehicle battery, and at least one thermal insulation component is included that is bound to the clamping element and also provides insulation for the flat surface of the vehicle battery;
  wherein the clamping element is disposed for contact between a casing of the vehicle battery and the at least one coolant line; and
  wherein upper surfaces of upper sides of the at least one coolant line are aligned with between 35% and 70% of the total surface area of the base of the battery that is to be cooled.

20. A cooling device according to claim 19, wherein the clamping element is at least partially embedded in the at least one thermal insulation component.

* * * * *